Joseph Carobbe
INVENTOR.

BY Karl G. Ross
Attorney

United States Patent Office 3,336,993
Patented Aug. 22, 1967

3,336,993
SELF-PROPELLED DIRIGIBLE AMUSEMENT
VEHICLE
Joseph Carobbe, 47 Ave. Pierre Wiehme,
Pessac, France
Filed June 7, 1965, Ser. No. 461,656
Claims priority, application France, Mar. 11, 1965,
8,784, Patent 1,441,527
3 Claims. (Cl. 180—2)

ABSTRACT OF THE DISCLOSURE

A self-propelled dirigible amusement vehicle for rapid change of direction comprising a support frame and three angularly spaced wheel assemblies swivelable about respective vertical axes, a drive means such as an electric motor powered from contact of the vehicle with a terminal-forming surface such as a ceiling and floor and coupled with one wheel assembly, steering means such as a centrally disposed steering wheel carried by the frame, and transmission means for connecting the steering means with each of the wheel assemblies for steeringly rotating them about the respective vertical axes, the steering means including a drive gear rotated by the steering wheel centrally of the frame, a driven gear carried by each of the assemblies, and a respective radially extending shaft having pinions meshing with the driving gear and each of the driven gears respectively. An indicator shows the orientation of the wheel assemblies.

---

This invention relates to vehicles for fun fairs, of the type called "Auto-Scooters" or colliding cars, a fun-fair amusement wherein electric cars are energized from the track on which they are driven.

The vehicle according to this invention comprises a frame supported by three wheels (or three trains of wheels), one wheel being driven from an electromotor, steering means characterized in principle in that the three wheels (or trains of wheels) are each adapted to pivot about a vertical axis, and kinematic transmission means coupling each wheel to said steering member in order to pivot them in synchronism.

This vehicle, due to the identical and simultaneous orientation of the three wheels, is adapted to move in all directions under the control of the driver acting upon the steering member, usually a steering wheel.

According to an embodiment of this invention, the steering member is rigid with a toothed annulus in constant meshing engagement with three pinions each keyed to a shaft driving through another pinion a toothed wheel the rotation of which causes the rotation of the corresponding wheel strap.

Other features and advantages of this invention will appear as the following description proceeds with reference to the accompanying drawing illustrating diagrammatically the manner in which the invention may be carried out in practice. In the drawing.

Figure 1:
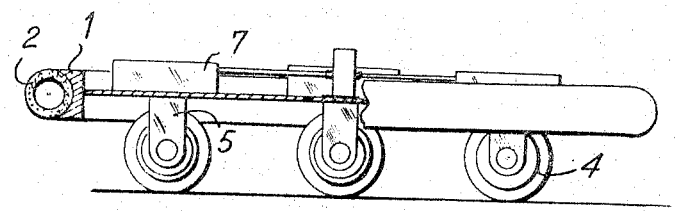
FIGURE 1 is a fragmentary section showing a vehicle constructed according to the teachings of this invention the seats and coachwork, if any, being removed for the sake of clarity.
Figure 2:
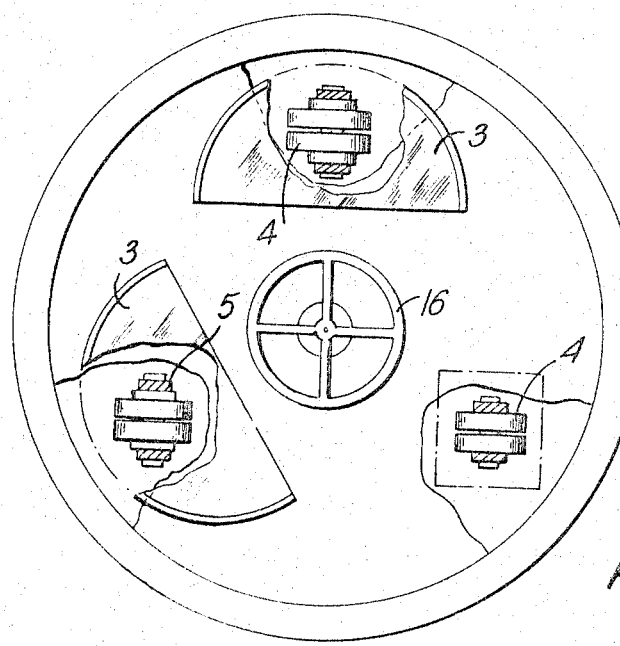
FIGURE 2 is a plan view of the same vehicle with parts broken away to show the wheel straps.
Figure 3:
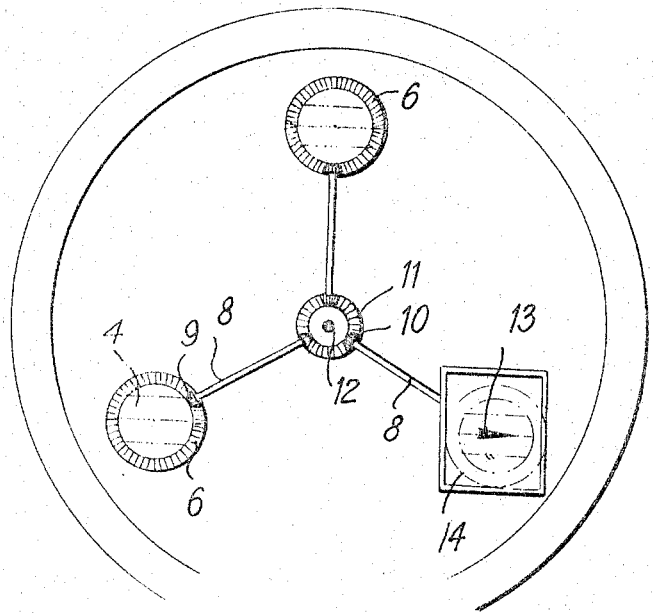
FIGURE 3 is a plan view of the vehicle with the floor removed therefrom in order to show the kinematic transmission provided between the steering wheel and the wheel straps.

As shown in these figures, the vehicle according to this invention comprises a frame 1 in the form of a rim supporting a shock-absorbing ring 2, this rim being connected through a floor-forming canvas to the various seat supports 3; three wheels as shown at 4 support the floor by means of strap-like yokes 5 adapted to swivel in relation to said floor. A steering wheel 16 is disposed centrally of the floor in this construction and is adapted, when rotated, to swivel all the straps 5 and therefore the wheels 4 simultaneously.

Two of said wheels 4 are driven from an electro-motor or motor and reduction gear unit mounted coaxially therewith.

The straps 5 are rigid with a crown gear 6 mounted in a casing 7 receiving the driving ends of radial shafts 8 carrying at their ends bevel pinions such as 9, 10, each pinion 9 meshing with one of said toothed crown wheels 6, and each pinion 10 meshing with a central toothed annulus 11 rotatably entrained with the shaft 12 of steering wheel 16.

It is clear that any rotation impressed upon the steering wheel 16 will cause the corresponding rotation of annulus 11, bevel pinions 10, shafts 8, bevel pinions 9, crown gears 6 and consequently, straps 5. Since the rotational movements performed by the various crown gears 6 are synchronous, the wheels will always have the same angular setting as selected by the driver, and therefore the vehicle may be moved in all directions, and the driver will thus be able to change the steering angle without being impaired by known steering impediments as usually observed in conventional steering mechanisms.

However, this system although advantageous in that it permits of steering the vehicle along any desired zig-zag course is objectionable in that when the vehicle is at a standstill the driver cannot know the direction in which it will move when re-started.

Therefore, the above described arrangement must be completed with some kind of direction indicator having a kinematic connection with the steering mechanism or one of the wheel straps.

This indicator may be embodied as a dial provided with a rotary pointer connected through a rigid or flexible transmission member to one of said straps 5. Thus, when the strap is pivoted by means of the steering wheel 16, the pointer 13 of indicator 14 will move through the same angular amplitude and thus show the direction in which the vehicle is about to be driven, provided of course that this pointer is properly adjusted so as to be constantly parallel to the median circumferential plane of one of the wheels of the vehicle.

Thus, the driver, according to the position of the indicator pointer, will be aware of the direction taken by the vehicle when the latter is re-started. Of course, other direction indicators may be contemplated for example in the form of a luminous device comprising a plurality of lamps disposed on a circle and each connected to a contact stud carried by the frame of the vehicle and electrically connected in turn to a source of electric current through a rotary brush revolving bodily with the wheel strap concerned.

Of course, it would not constitute a departure from the present invention to bring various modifications and variations in the forms of embodiment of this invention which are shown and described herein, provided that the basic principles of this invention as set forth in the appended claims are adhered to.

What I claim as new is:
1. A fun-fair amusement vehicle of the type driven by means of an electromotor energized from the surface on which the vehicle is driven, which comprises a frame; three wheels, at least one of said wheels being driven from said electromotor; a respective support carrying each of said wheels; means for mounting each support to swivel about a vertical axis; a steering member; a driving toothed annulus rotatably entrained with said steer- ing member; three radial shafts; a respective driven toothed wheel rigid with each one of said shafts; and a respective pair of pinions rigidly mounted each on one end of each of said shafts, one of said pinions of each pair meshing with said driving toothed annulus, the other pinion of each pair meshing with one of said driven toothed wheels.

2. A fun-fair amusement vehicle as defined in claim 1, further comprising a steering indicator viewable by an operator on said frame and coupled with at least one of said wheels for indicating the direction of angular orientation thereof.

3. A self-propelled dirigible amusement vehicle adapted to rapid change of direction, comprising:
a support frame carrying at least one seat for an operator of the vehicle;
three angularly spaced wheel assemblies mounted on said frame and swivelable thereof about respective vertical axes;
a motor carried by said frame and drivingly connected to at least one of said assemblies for powering same;
operator-controlled steering means on said frame; and
transmission means connecting said steering means with each of said wheel assemblies for simultaneously and equally swinging same about their respective axes upon actuation of said steering means, said steering means being a steering shaft disposed centrally of said wheel assemblies and said transmission means including a drive gear rotatable by said shaft, a respective driven gear rotatably entraining each of said assemblies, and a respective generally radial pinion shaft meshing with said drive gear and with each of said driven gears, respectively, for rotating said wheel assembly upon rotation of said steering shaft.

References Cited
UNITED STATES PATENTS

| | | | |
|---|---|---|---|
| 840,422 | 1/1907 | Bassett | 180—2 |
| 1,467,456 | 9/1923 | Silvius. | |
| 1,703,360 | 2/1929 | Phillips et al. | 180—2 |
| 1,982,391 | 11/1934 | Markey | 180—2 |
| 2,950,121 | 8/1960 | Fisher | 280—47.11 |
| 3,008,446 | 11/1961 | Quayle | 116—31 |
| 3,031,024 | 4/1962 | Ulinski | 116—31 X |
| 3,126,208 | 3/1964 | De Voghel | 280—47.11 |

LEO FRIAGLIA, *Primary Examiner.*